Oct. 30, 1956  F. W. KIBLER ET AL  2,768,468
TENSION RELEASE CLIP
Filed Jan. 7, 1953

INVENTORS
FREDERICK W. KIBLER &
WILLIAM J. McNIFF
BY
Dicke and Padlon
ATTORNEYS

United States Patent Office 2,768,468
Patented Oct. 30, 1956

2,768,468

TENSION RELEASE CLIP

Frederick W. Kibler, Beechhurst, and William J. McNiff, Wantagh, N. Y.; said McNiff assignor to said Kibler Application January 7, 1953, Serial No. 330,038

2 Claims. (Cl. 43—43.12)

The present invention relates to the art of fishing and more particularly to a tension release device for fouled or snagged fishing tackle.

A common occurrence in the art of fishing is for the fish hook or sinker to become permanently fouled or caught on some object under the water surface such as marine growth or some other foreign object lying on the water bed itself. When the fouled hook or sinker cannot be easily slipped off or disengaged from the object it is necessary to exert a force or pull above the designed strength of the fishing tackle. This results in loss of the fishing line and sometimes damage to or snarling of the rest of the fishing tackle in addition to the loss of the caught hook or sinker.

Another problem involved is engaging larger game than that for which the fishing tackle is designed. The result here is also snapping of the line causing damage or snarling of other parts of the tackle such as the fishing pole and reel.

In accordance with the present invention, a tension or spring clip release device is provided for releasing the caught hook or sinker and preventing loss of the line and damage to other portions of the fishing tackle.

Another object of the present invention is the provision of a tension clip release device having no moving parts which can get out of order.

The present invention provides a tension clip release device with an expendable release part for use in many arts where a safety release is used.

A further advantage of the present invention is the provision of a tension clip release device which can be set to release a holding device for a predetermined force or pull.

Further advantages and features of the invention will become apparent when taken in connection with the following detailed description and accompanying drawings in which.

In the drawings, like characters of reference refer to the same or to similar parts throughout the several views.

Figure 1:
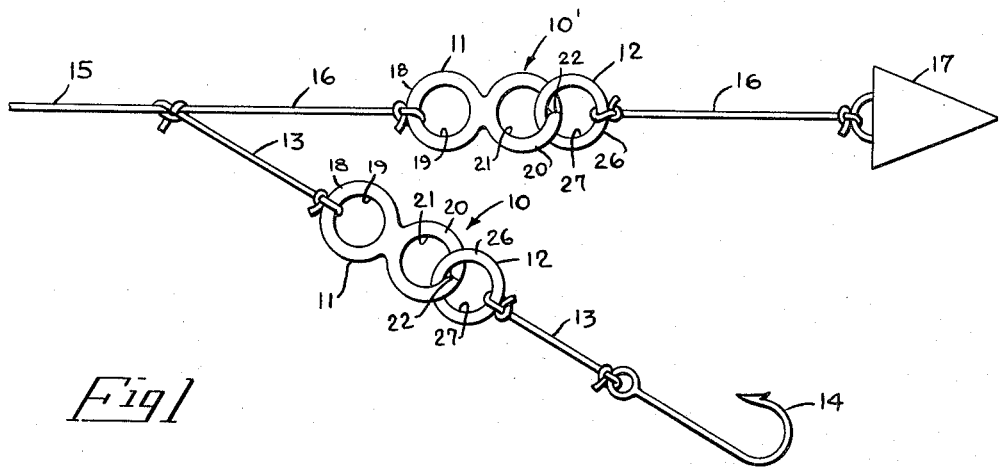
Fig. 1 is a view of fishing tackle in which the invention is preferably embodied.

Referring to the drawings, release devices 10 and 10' are provided having a tension or spring clip 11 and an associated washer portion 12. As shown in Fig. 1, the release device 10 is secured in a fish hook line 13—13 between a fish hook 14 attached to one end thereof and the main fishing line 15 attached to the other end thereof. The other release device 10' is secured in a sinker line 16—16 between a sinker 17 attached to one end thereof and the main fishing line 15 attached to the other end thereof. Line 15 is secured to a fishing pole or gear, not shown, on the other end thereof.

Clip 11 is made of a resilient material, preferably metal, and has the shape of a figure 8 having an upper flat annular attaching ring 18 with a central opening 19 therein and a lower annular release ring 20 with a central opening 21 therein. Clip 11 is preferably made from a single piece of material as shown, by a stamping process, but it may be made from separate pieces, if so desired, and joined together with any conventional means. The lower portion of ring 20 has a substantially vertical cut or slot 22 therein extending through the ring along the vertical axis which bisects the central openings 19 and 21 of rings 18 and 20, respectively, thereby dividing ring 20 into halves or portions 23 and 24. A tapered or beveled guide 25 is provided on the inner periphery of ring 20 adjacent slot 22 by tapering or beveling the inner periphery of ring 20 at this point. Guide 25 enables the releasing device to operate more smoothly as hereinafter described.

Washer portion 12 of the device comprises a flat annular washer 26 having a central opening 27 therein. Washer 26 is detachably secured within central opening 21 of release ring 20 by separating or pulling away from one another portions 23 and 24 and slipping either portion through central opening 27 of washer 26 after which portions 23 and 24 are released to spring back together and lock the washer 26 within release ring 20.

In operation, washer 26 is inserted in release ring 20 of tension clip 11 by pulling apart or separating portions 23 and 24 of ring 20 and slipping either portion through opening 27 in washer 26 after which the portions are released and snap together thereby locking washer 26 within the ring. Attaching ring 18 is then tied to the fishing line side of fish hook line 13 and washer 26 to the fish hook side thereof. A fish hook 14 is thereafter tied on the end of line 13. In sinker line 16, after washer 26 is inserted and locked within release ring 20 as above described, attaching ring 18 is tied to the fishing line side of sinker line 16 and washer 26 to the sinker side thereof. Sinker 17 is thereafter tied to the end of line 16.

When hook 14 or sinker 17 becomes caught on an object, a force or pull exerted on fishing line 15, which is greater than the inherent tensioning force of the release device holding portions 23 and 24 against one another, will cause washer 26 to slide around in ring 20 to guide 25 and through slot 22 thereby disengaging the fouled hook or sinker from the rest of the line. Thus the expendable washer and caught hook or sinker only is lost and no other damage or snarling occurs to the rest of the fishing tackle.

Since fishing lines are made of a given tension or strength, that is, the number of test pounds pull, is given which will break the line, the release device may be made of a material having a certain test tension in test pounds which will enable the spring part of the device to open and permit a washer of a certain thickness to slip through. If more than one release device is to be inserted on the end of a line, release devices having a slightly lower test tension would be used just so long as the sum total test pounds of the devices does not exceed the test pounds of the main fishing line. Thus, our invention enables a fish hook or sinker release device to be set for releasing at a predetermined value.

Figure 2:
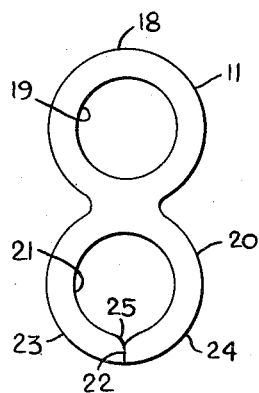
Fig. 2 is an enlarged view in plan of the tension clip embodied in the invention shown in Fig. 1.
Figure 3:
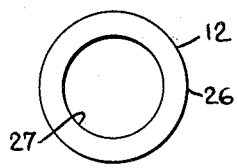
Fig. 3 is an enlarged view in plan of the washer portion of the invention embodied in Fig. 1.
Figure 4:
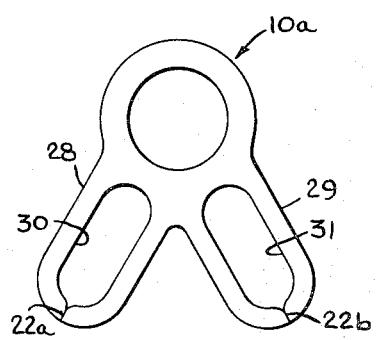
Fig. 4 is a view similar to Fig. 2 but of another modification of the tension clip embodied in the invention.

Referring to Fig. 4, the embodiment of the invention and operation is substantially similar to that of Fig. 2 except that a tension clip 10a is provided having a plurality of elongated or rectangular shaped divergently extending release rings 28 and 29 with rectangular openings 30 and 31, respectively, therein, and slots 22a and 22b, respectively.

From the foregoing description the invention is applied to fishing and tow lines. However, the invention can also be used in other fields such as in the armed forces. For example, in the present day fueling of planes while in flight, our release device could be used in the connecting cable attached between the two planes and supporting the fuel hose. If some instability in flight should occur, our release device would automatically release the connecting cable when a greater force or pull occurs on the cable than that for which the release device is set thus preventing damage to either plane structure which could end with either plane crashing.

Another example of the use of our invention is in connection with paravanes used on navy ships to sweep a channel of water clear of floating mines. A cable is attached to the bow of the ship and to the other end is secured a paravane. The paravane is dragged under the water by the ship and outwardly and to the rear of the ship, the paravane having fins or rudders to position it in relation to the ship. Floating mines under water slide down the inclined cable away from the ship to the paravane where cutting means release the mine and it bobs to the surface to be disposed of. Our release device inserted in the cable and set at a predetermined value would release the paravane and prevent any premature setting off of the mine, with damage to the ship, caused by a sudden jolt in case the mine cable is caught or fouled on the bottom.

While a preferred embodiment of the invention has been illustrated and described, it will be understood that it embraces other variations and modifications as to form, use and arrangement of materials as coming within the spirit and scope thereof.

We claim:

1. The combination with a fishing tackle of a flat shaped tension clip comprising an upper and lower ring each having a central opening therein, said lower ring having a slot extending through the lower part thereof along an axis bisecting said central ring openings so as to divide said lower ring into two tensioned resilient portions abutting one another, the lower ring having a beveled guide edge in the inner periphery thereof adjacent said slot, a line having one end connected to said upper ring and the other end to fishing tackle, a flat washer having a central opening therein with the lower ring passed therethrough so as to be detachably secured within the central opening of said lower ring, and another line having one end connected to said washer and the other end to other fishing tackle so that a pull exerted on said latter line greater than the tensioning force in the resilient portions of the lower ring will cause them to separate and the washer to slip through said lower ring slot thereby disengaging the washer and fishing tackle to which it is attached from the lower ring.

2. The combination with fishing tackle of a tension clip comprising an upper solid attaching ring having a central opening therein, a plurality of lower release rings having openings therein, said release rings flaring from said attaching rings, each of said release rings having a slot extending through the lower part thereof defining tensioned resilient ring portions abutting one another, each of said release rings having beveled edges in the inner ring periphery thereof adjacent said slot, a line having one end connected with said attaching ring and the other end to fishing tackle, flat washers having a central opening therein with said resilient portions of the release rings passed therethrough so as to be detachably secured within the opening of said release rings, and other lines having one end connected to said washers and the other end to other fishing tackle, so that when a force is exerted on the lines attached to the washers greater than the tensioning force in the resilient portions of the release rings, it will cause the ring portions to separate permitting the washer to slip through the slot to disengage it and the attached fishing tackle.

References Cited in the file of this patent

UNITED STATES PATENTS

| | | |
|---|---|---|
| 396,404 | Kelley | Jan. 22, 1889 |
| 1,485,888 | Schonberg | Mar. 4, 1924 |
| 1,752,619 | Summerfeld | Apr. 1, 1930 |
| 1,837,426 | Ghisolfo | Dec. 22, 1931 |
| 2,121,279 | Beck | June 21, 1938 |
| 2,231,616 | Costantino | Feb. 11, 1941 |
| 2,271,899 | Miller | Feb. 3, 1942 |
| 2,392,335 | Morrill | Jan. 8, 1946 |
| 2,414,945 | Grund | Jan. 28, 1947 |
| 2,509,598 | Hart | May 30, 1950 |
| 2,680,928 | Silva | June 15, 1954 |

FOREIGN PATENTS

| | | |
|---|---|---|
| 79,991 | Germany | 1920 |